May 7, 1935.  P. E. HOSEGOOD  2,000,758
TIMER
Filed May 29, 1933
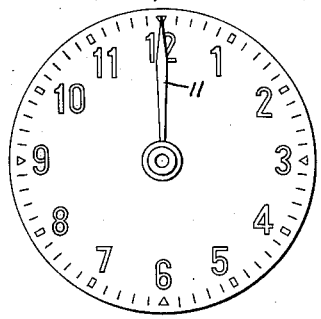
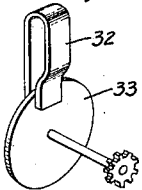
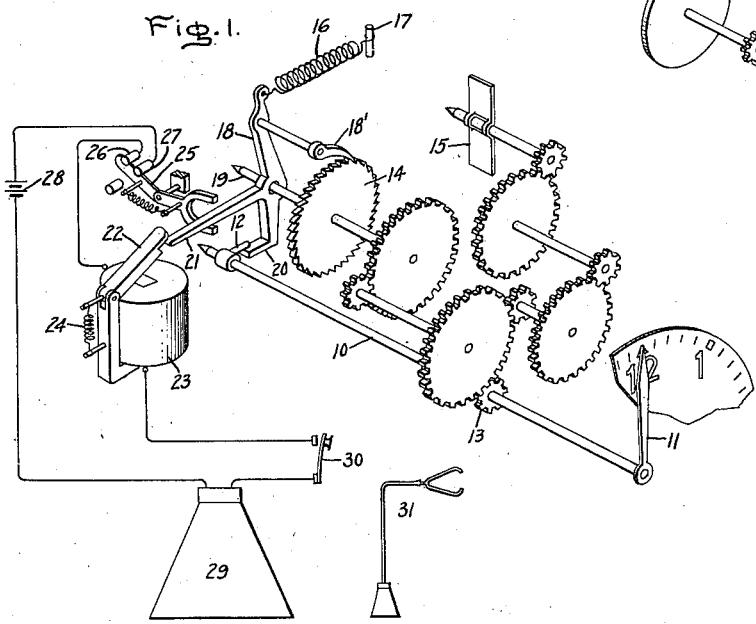
Inventor:
Philip E. Hosegood,
by Harry E. Dunham
His Attorney.

Patented May 7, 1935

2,000,758

UNITED STATES PATENT OFFICE 2,000,758

TIMER

Philip E. Hosegood, Schenectady, N. Y., assignor to General Electric Company, a corporation of New York Application May 29, 1933, Serial No. 673,496

1 Claim. (Cl. 177—386)

My invention relates to timers, and in particular to a timer for use in determining distances by the sound echo method. The timer of my invention is particularly designed for use on aeroplanes to determine the elevation of the plane above the earth or other sound-reflecting body when the latter is obscured from the plane by darkness, fog, etc. Such devices are useful as an aid to the aeroplane pilot when approaching the earth preparatory to landing, or in safely clearing mountains. It goes without saying that such devices should be reliable and reasonably accurate. To be of the greatest service they always should be ready for operation, should operate in a simple manner, and should give the altitude reading directly without calculations. It is also desirable that such apparatus be small in size and light in weight. It is an object of my invention to provide a timer having the above mentioned requirements.

The features of my invention which are believed to be novel and patentable will be pointed out in the claim appended hereto.

For a better understanding of my invention, reference is made in the following description to the accompanying drawing, showing in Fig. 1 an exploded perspective view of my timer mechanism; Fig. 2 is a front view of the timer showing the direct reading dial and pointer; and Fig. 3 shows a magnetic brake that may be used in place of the fan brake of Fig. 1.

In Fig. 1, I have represented the parts of my timing mechanism sufficiently separated to give a clear picture of their operating relation, but it will be understood that in actual practice a more compact assembly will be used, and it may be stated that the complete timing device here shown has been assembled in a cylindrical casing less than 3" in diameter and 2½" long, the dial shown in Fig. 2 comprising the front end portion of such casing.

The time mechanism comprises the main time shaft 10 having a pointer 11 secured at its forward end and a stop finger 12 secured at its rear end. The stop is for the purpose of obtaining a predetermined stop position of the pointer on the dial scale with which it cooperates. At an intermediate point shaft 10 is secured by a pinion 13 to a gear train extending between a ratchet wheel 14 and a fan brake 15. The gear relation between ratchet wheel 14 and shaft 10 is such that the latter will make one complete revolution for a part rotation of the ratchet wheel corresponding to one tooth distance. In one of the devices as built the ratchet wheel 14 has 40 teeth, making the speed multiplying gear ratio between 14 and 13, 1 to 40. The multiplying gear ratio between ratchet wheel 14 and fan brake 15 in the device just referred to is about 1 to 3500.

While I do not wish to confine my invention to the gear ratios specified above, these figures represent one combination that has proven satisfactory for a given size of fan brake and a given driving force applied to ratchet wheel 14.

The driving force for the timing train is supplied by a spring 16, one end of which is secured to a stationary support at 17, and the other end is fastened to the operating lever 18. A ratchet pawl 18' cooperating with ratchet wheel 14 is pivoted to and operated from lever 18. Lever 18 is pivoted on the shaft 19 of the ratchet wheel 14, but is free to rotate with respect to said shaft. Lever 18 is provided with a downwardly extending finger with an offset end portion forming a stop catch 20 for the stop arm 12 on the pointer shaft 10. Lever 18 is operated by a third arm 21 which extends to a point in the path of the armature 22 of an electromagnet 23. When the electromagnet is deenergized as shown a spring 24 retains the armature 22 in the released and raised position shown. The operating arm 21 of lever 18 also operates a toggle switch 25. The toggle switch 25 has contacts 26 and 27 in series in the circuit of relay 23, a battery 28, a sounding horn 29, and a switch 30. The contacts 26 and 27 are closed when the arm 21 of the operating lever is in the raised position shown.

When it is desired to take an altitude sounding, the pilot momentarily closes switch 30. This switch is preferably biased to open position so that it opens when released. The closure of switch 30 sounds horn 29 and energizes relay 23. Relay armature 22 is pulled downward to energized position and carries operating arm 21 with it. The downward movement of arm 21 simultaneously performs several functions, as follows: Toggle switch 25 is operated to open the circuit of relay 23 at contacts 26 and 27, catch 20 is moved to release stop arm 12 on the main timer shaft 10, and arm 18 is moved to tension spring 16, and ratchet pawl 18' is retracted so as to drop behind the next tooth in ratchet wheel 14. As soon as the toggle switch 25 operates to open the circuit of relay 23 its armature 22 is released and again moves to the position shown. Lever 18, with its operating arm 21, catch arm 20 and pawl 18', is now rotated in a clockwise direction to its original position by the energy stored in spring 16. However, in so rotating it must drive the gear train leading to pointer 11 and fan brake 15 an amount corresponding to one tooth distance of ratchet wheel 14. Thus, while armature 22 is immediately released after being energized due to the opening of its circuit by its own action at the toggle switch contacts 26 and 27, arm 18 returns more slowly to the original or deenergized position, its rate of travel being retarded by the fan brake 15 operated through the gear train. For aeroplane sonic-altimeter purposes, the design and adjustment will ordinarily be such as to cause the pointer 11 to make a complete revolution in a definite period of time between about two and six seconds.

As lever 18 returns to its original or deenergized position, the toggle switch 25 is returned to its original position to close the circuit of relay 23 at contacts 26 and 27. This closure takes place near the upper limit of travel of arm 21 and hence an appreciable time interval after the pilot has closed and released switch 30. It will be evident that the toggle switch thus serves to time the duration of the sounding of horn 29 and make these sounds of uniform duration without attention from the pilot, since the pilot starts the horn sounding by closing switch 30, and a definite short interval thereafter the sounding is interrupted by the opening of the circuit at the toggle switch contacts 26 and 27. Thereafter, and before the circuit is again closed at the toggle switch, the pilot releases switch 30. This uniform duration of sound by the horn 29 contributes to the accuracy of the final result. The reclosing of the circuit at the toggle switch conditions the circuit for a subsequent operation without attention from the pilot.

As the lever 18 returns to the deenergized position represented in the drawing, catch 20 again moves into the path of stop arm 12, so that as the shaft 10 completes a revolution in a clockwise direction it is brought to a stop with the pointer 11 on the zero mark of the dial ready for a subsequent operation without attention from the pilot.

The strength and adjustment of spring 16, the gear ratio, and the effect of the brake are made such that the rate of operation of the gear train for a complete rotation of shaft 10 is substantially uniform. It is started when the tension of the spring is a maximum and when the braking effect is negligible. Thus, acceleration to the normal speed determined by the braking effect at 15 at the high speed end of the gear train is very fast.

Fly-wheel effect assists in maintaining the speed near the end of the operation, when the tension of spring 16 is weakest. The train is brought to a sudden stop by arm 12 meeting catch 20. This stopping effect is applied at the intermediate point in the gear train, where it exactly positions the pointer 11 on zero regardless of any back lash that may exist in the gear train. The dial is preferably graduated in hundreds of feet—thus, 10 on the dial represents 1,000 feet elevation. The rate of the timing train is sufficiently uniform that a uniform scale graduation of the dial may ordinarily be used, although I do not limit my invention in this respect.

The pilot determines the altitude by noting the position of pointer 11 on the dial the instant the echo of the sound sent out by the horn 29 is detected, and he is provided with a suitable sound detecting apparatus, represented at 31, for this purpose.

Sound travels in air at the rate of about 1,090 feet per second, so that the apparatus will be so adjusted and calibrated that the pointer 11 will reach a point corresponding to 1,090 on the scale two seconds after the horn 29 is sounded, as the sound must travel twice the distance corresponding to the altitude. All points of the scale may, of course, be exactly calibrated by testing the device over measured distances.

It will be observed that all parts of the apparatus automatically return to the position and conditions shown in Fig. 1 following an operation, in which condition the apparatus is ready for another operation.

A brief review of the operation is as follows: The pilot or observer momentarily presses switch 30 and then glances at the dial and notes the position of hand 11 thereon when the echo is received. The apparatus performs all other functions automatically as follows—the initial short blast from horn 29 is transmitted; simultaneously, relay 23 operates, toggle switch 25 operates, deenergizing the relay and horn, pointer shaft 10 is released, spring 16 is tensioned and ratchet pawl 18' retracted one tooth and released, and the timing train started into operation. All of this occurs practically instantaneously. Spring 16 now gives up its energy to the time train, returning arm 21 to close the toggle switch and catch 20 to the position to stop arm 12 which stops the shaft 10 and pointer 11 after a complete revolution.

Where it is desired to provide a meter for greater distances, for example up to 2,400 feet, a magnetic brake such as is represented in Fig. 3 is preferable. Such a brake may consist of a stationary permanent magnet 32 and a copper or aluminum disk 33 driven by the high speed end of the gear train. Such a brake will result in a lower speed of the timing gear train, as it has a greater braking effect than a fan brake of the size suitable for a compact assembly.

Having thus described my invention and a preferred embodiment thereof, I seek a claim commensurate with the invention without limitation as to exact details such as are subject to change to suit different conditions and applications.

What I claim as new and desire to secure by Letters Patent in the United States is:

A timer for determining distances by the sound echo method, comprising a dial graduated in distance units, a time shaft having a pointer cooperating with said dial, a stop for said shaft for stopping the pointer at a predetermined indication on said dial, a speed multiplying gear train having a ratchet driving wheel at the low speed end and a speed controlling governor driven from the high speed end thereof, said train being connected in driving relation with said time shaft at an intermediate point so as to cause the time shaft to make one complete revolution for the advancement of the ratchet wheel a distance of one of its teeth, a ratchet pawl and operating lever for advancing said ratchet wheel, a spring secured to said lever and tensioned when the lever is moved to retract said pawl for supplying energy to drive said gear train, means operated by the last mentioned movement of said lever for disengaging the stop for the time shaft, sound-producing means and a relay included in an electric circuit, a manual energizing switch and an automatic deenergizing switch in said circuit, said relay when energized moving said lever to retract said pawl, tension said spring, release said time shaft, and open said automatic switch.

PHILIP E. HOSEGOOD.